United States Patent
Rosas et al.

[11] Patent Number: 5,975,116
[45] Date of Patent: Nov. 2, 1999

[54] VALVE HAVING MULTI-PIECE VALVE HOUSING

[75] Inventors: Manuel D. Rosas, Coleta, Ill.; Peter G. Weissinger, Sterling Heights, Mich.

[73] Assignee: Borg-Warner Automotive, Inc., Troy, Mich.

[21] Appl. No.: 09/114,818

[22] Filed: Jul. 13, 1998

Related U.S. Application Data

[63] Continuation-in-part of application No. 08/880,192, Jun. 20, 1997, which is a continuation-in-part of application No. 08/684,978, Aug. 7, 1996, abandoned.

[51] Int. Cl.$^6$ .................................................... F16L 37/24
[52] U.S. Cl. ............................ 137/315; 137/43; 137/202; 285/396; 285/402
[58] Field of Search ........................... 137/43, 202, 315; 285/361, 396, 402

[56] References Cited

U.S. PATENT DOCUMENTS

| | | |
|---|---|---|
| 1,812,583 | 6/1931 | Cavalieri . |
| 2,027,803 | 1/1936 | Young . |
| 2,781,148 | 2/1957 | Reddle . |
| 4,313,649 | 2/1982 | Morikawa et al. . |
| 5,251,776 | 10/1993 | Morgan et al. . |
| 5,397,196 | 3/1995 | Boiret et al. . |
| 5,413,137 | 5/1995 | Gimby . |
| 5,694,968 | 12/1997 | Devall et al. ........................... 137/202 |

FOREIGN PATENT DOCUMENTS

| | | |
|---|---|---|
| 473199 | 5/1975 | Australia . |
| 2308040 | 11/1976 | France . |
| 2658899 | 8/1991 | France . |
| 2066423 | 7/1981 | United Kingdom . |
| 2140888 | 12/1984 | United Kingdom . |
| WO 96/04089 | 2/1996 | WIPO . |

*Primary Examiner*—Gerald A. Michalsky
*Attorney, Agent, or Firm*—Reising, Ethington, Barnes, Kisselle et al.; Greg Dziegielewski

[57] ABSTRACT

A vent valve for a gasoline tank has a multi-piece valve housing that is inserted into the tank through a tank wall opening. The housing includes a valve member and a cap member that has a flange that is ultrasonically welded to the gasoline tank and a coupling skirt that has minimal protrusion into the gas tank. The coupling skirt fits into upper portion of the valve member and has keyways that receive inwardly projecting lugs of the valve member to couple the valve and cap members to each other. The valve and cap members are retained in the coupled position by resilient cantilevered lock fingers of the valve member that engage notches in the bottom of the coupling skirt. In a modification the notches coincide with entrance portions of the keyways. The cap member of a second embodiment has a coupling skirt with keyways that fit over an upper portion of the valve member that has outwardly projecting lugs and resilient lock fingers that are cut out of the wall of the valve member. In a modification the outwardly projecting lugs and lock fingers are part of the coupling skirt and the keyways are part of the valve member. The cap member of a third embodiment has a coupling skirt with keyways that receive inwardly projecting lugs of the valve member to couple the valve and cap members to each other. The lugs are retained in the coupled position by notches at the inner ends of the keyways.

11 Claims, 5 Drawing Sheets

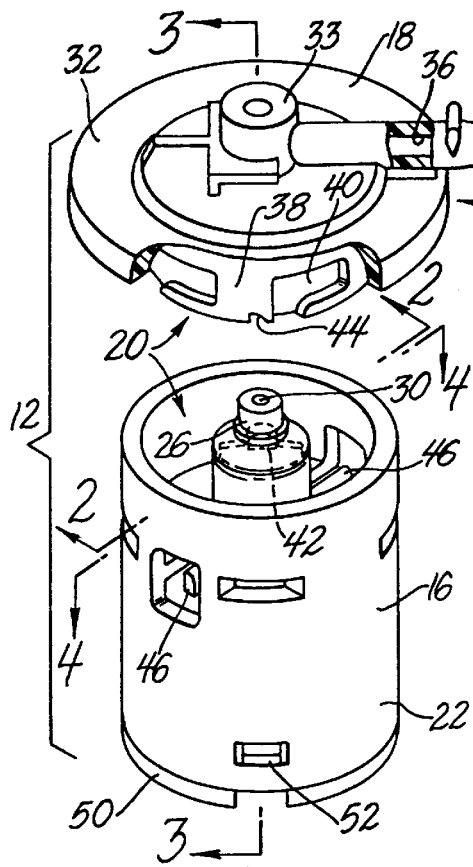
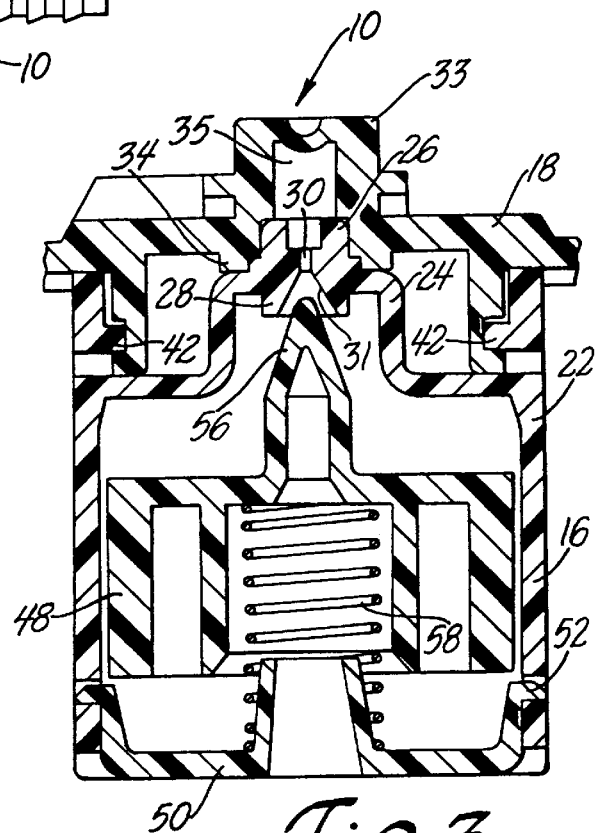
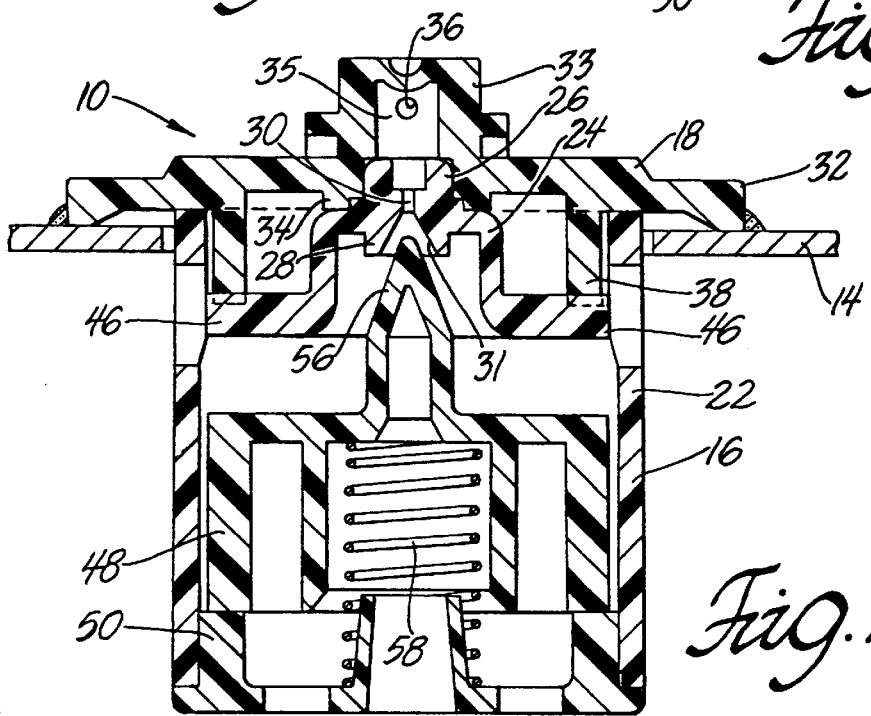
Fig. 1
Fig. 3
Fig. 2

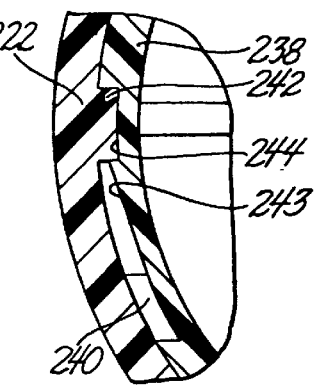
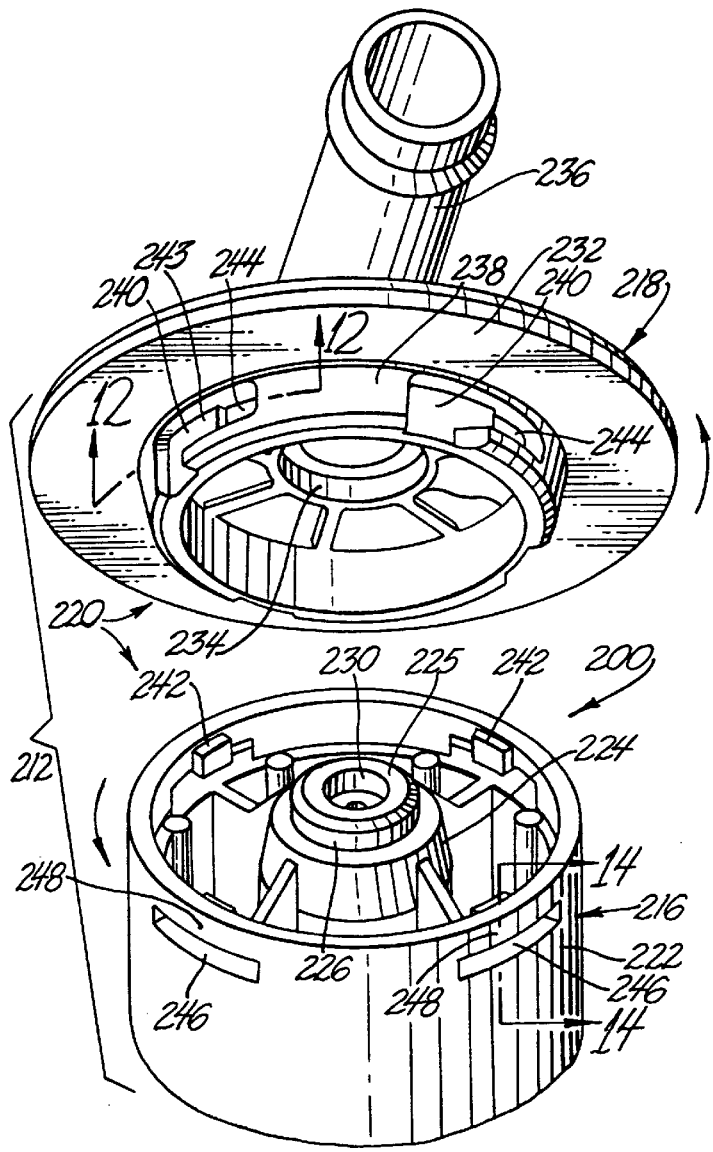
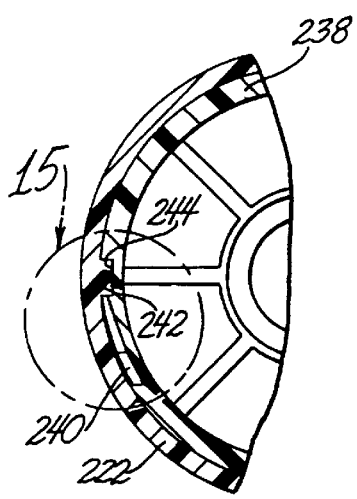
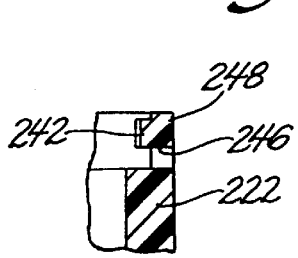
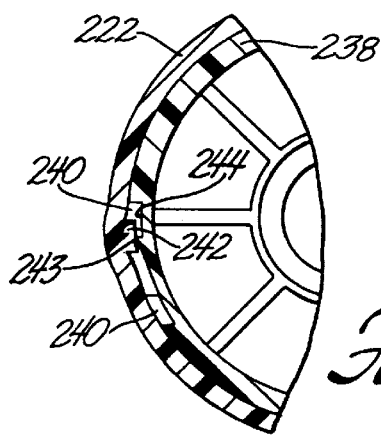

VALVE HAVING MULTI-PIECE VALVE HOUSING

RELATED APPLICATIONS

This is a continuation-in-part of U.S. patent application Ser. No. 08/880,192 for a Valve Having Multi-piece Valve Housing filed Jun. 20, 1997 which is a continuation-in-part of U.S. patent application Ser. No. 08/684,978 for a Valve Coupling Mechanism filed Aug. 7, 1996 and now abandoned.

BACKGROUND OF THE INVENTION

This invention relates to a coupling mechanism for attaching one member to another member and to a valve having a multi-piece valve housing that includes such a coupling mechanism for attaching one housing member to another housing member.

Coupling mechanisms for attaching one member to another are already known for various constructions. See for instance: U.S. Pat. No. 1,812,583 to Cavalieri; U.S. Pat. No. 2,027,803 to Young; U.S. Pat. No. 2,781,148 to Reddle; U.S. Pat. No. 4,313,649 to Morikawa et al; U.S. Pat. No. 5,251,776 to Morgan, Jr. et al; and U.S. Pat. No. 5,397,196 to Boiret et al which disclose coupling mechanisms of the so called bayonet slot type in various applications.

Valves having multi-piece valve housings are also known but none are known that use coupling mechanisms of the bayonet slot or quick disconnect type.

U.S. Pat. No. 5,413,137 granted to David R. Gimby May 9, 1995 discloses a fuel vapor vent assembly that has a multi-piece valve housing. The housing includes a body member that has an integral cap member. The housing also includes an insert and a spring seat. The insert is press fitted into the upper end of the body member to provide an orifice for fuel vapors to escape from the fuel tank and a liquid trap basin above the orifice for catching any liquid fuel entrained in the fuel vapors that exit the fuel tank through the orifice. The spring seat has hooks that are snap fit into apertures of the body member for retention. The fuel tank and the valve member are made of a high density polyethylene (HDPE), a material that is known for high strength, weldability and resistence to gasoline fuel. This insert is preferably made of acetal copolymer that is highly resistant to fuel permeation and therefore does not grow when immersed in gasoline.

U.S. Pat. No. 5,522,417 granted to Kazuyki Tomoika and Atsushi Takahashi Jun. 4, 1996 discloses an anti-spilling valve for a vehicle fuel tank that has a multi-piece valve housing. The housing includes a valve chamber, a mounting member and a valve seat ring. The valve chamber which is immersed in gasoline is advantageously formed of polyacetal resin to minimize growth while the mounting member is advantageously made of high density polyethylene resin (HDPE) for weldability to the fuel tank which is commonly made of this material. The three parts are fabricated and assembled by molding the mounting member of HDPE resin over the upper end of a premolded valve chamber formed of polyacetal resin. The valve seat ring is then fixed to the valve chamber by ultrasonic welding.

SUMMARY OF THE INVENTION

In one aspect, the object of this invention is to provide a coupling mechanism that is easily engaged by sliding one member into another member axially, and then twisting one member relative to the other member to retain the members together in a locked engagement that cannot be released without manual manipulation.

In another aspect, the object of this invention is to provide a valve that has a multi-piece valve housing that has such a coupling mechanism for attaching one valve housing member to another valve housing member.

In yet another aspect, the object of this invention is to provide a valve for insertion into a gasoline fuel tank that has a multi-piece valve housing that includes members configured for advantageous use of different materials and/or advantageous incorporation of a coupling mechanism for securely coupling the members together easily.

In still another aspect, the object of this invention is to provide a multi-piece assembly that incorporates a snag-proof coupling mechanism for attaching two members of the multi-piece assembly pieces to each other.

These and other objects, features and advantages of the invention will become more apparent from the following description of a preferred embodiment taken in conjunction with the accompanying drawing.

BRIEF DESCRIPTION OF THE DRAWING

FIG. 1 is an exploded perspective view of a fuel vapor vent valve having a multi-piece housing that includes a coupling mechanism in accordance with the invention;

FIG. 2 is a section taken substantially along the line 2—2 of FIG. 1 looking in the direction of the arrows;

FIG. 3 is a section taken substantially along the line 3—3 of FIG. 1 looking in the direction of the arrows;

FIG. 11 is an exploded perspective view of a still another fuel vapor vent valve having a multi-piece housing that includes a coupling mechanism in accordance with the invention;

FIG. 12 is a section taken substantially along the line 12—12 of of the arrows after the housing parts are coupled together;

FIG. 13 is a section similar to the section of FIG. 12 showing the housing parts before coupling is completed;

FIG. 14 is a section taken substantially along the line 14—14 of FIG. 11 looking in the direction of the arrows; and FIG. 15 is an enlargement of the encircled portion of FIG. 12.

DESCRIPTION OF THE PREFERRED EMBODIMENT

Figure 4:
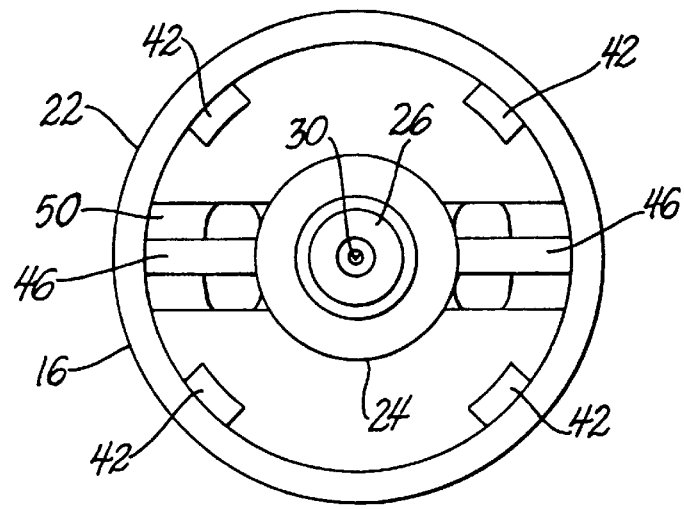
FIG. 4 is a section taken substantially along the line 4—4 of FIG. 1 looking in the direction of the arrows.

Referring now to the drawing and more particularly to FIGS. 1, 2, 3 and 4, the fuel vapor vent assembly 10 comprises a multi-part valve housing 12 of molded plastic construction for insertion into a fuel tank 14 through an opening through a wall of the tank as best shown in FIG. 2. Housing 12 comprises a valve member 16 and a cap member 18 that are attached together by a coupling arrangement indicated generally at 20. Valve member 16 is preferably molded of a material that is highly resistant to gasoline fuel permeation and experiences little or no growth when immersed in gasoline, such as acetyl resins and copolymers. On the other hand, cap member 18 is preferably molded of material that is readily weldable to gasoline tanks such as high density polyethylene (HDPE).

Structurally, valve member 16 has a cylindrical wall 22 that has an outer diameter that is somewhat smaller that the diameter of the opening through the wall of the fuel tank 14 so that the valve member 16 can be inserted into the fuel tank 14 through the opening easily. Valve member 16 has a hat shaped top wall 24 that supports a vertical tube 25 that defines upper and lower aligned collars 26 and 28 and a vertical passage 30 through the top. Passage 30 includes an upper liquid catch basin in upper collar 26, a central orifice and a lower valve seat 31 in lower collar 28.

Cap member 18 has a flange 32 that has an outer diameter that is considerably larger than the diameter of the opening through the wall of the fuel tank 14. Thus flange 32 is adapted to be attached to an exterior surface of the wall of the fuel tank 14 when valve member 16 is inserted into the fuel tank. Cap member 18 is preferably welded to the top of fuel tank 14 as indicated in FIG. 2.

Cap member 18 includes upper and lower collars 33 and 34 that define a seat for upper collar 26 of valve member 16, a vapor cavity 35 above the liquid catch basin in upper collar 26, and a traverse exit passage 36 that extends through an exit pipe above flange 32.

Upper collar 26 of valve member 16 and lower collar 34 of cap member 18 form a sealed passage from the valve seat 31 to the outboard end of the exit pipe when the upper collar 26 of valve member 16 is seated in the lower collar 34 of cap member 18 by coupling the valve and cap members 16 and 18 together.

The means for coupling cap member 16 to valve member 18 includes a depending skirt 38 of cap member 16 that is sized for insertion into the upper end portion of the cylindrical wall 22. The outer wall of skirt 38 includes a plurality of circumferentially spaced keyways 40. Keyways 40 are generally L-shaped and have an axial open-ended leg that leads to a circumferential close-ended circumferential leg. Valve member 18 has a corresponding number of circumferentially spaced lugs 42 on the inner surface of cylindrical wall 22 that protrude radially inwardly. Lugs 42 enter keyways 40 via the entrances of the open ended axial legs when skirt 38 is inserted into cylindrical wall 22 and engage the circumferential legs in a coupling position when valve member 18 is then rotated in a clockwise direction with respect to cap member 16. Lugs 42 preferably engage the closed ends of the circumferential legs in the coupling position.

The cap member 18 and the valve member 16 also include means for retaining lugs 42 in the coupling position comprising a plurality of circumferentially spaced notches 44 in the bottom of skirt 38 and two resilient lock fingers 46 of the valve member 16 that engage two of the circumferentially spaced notches 44 when the lugs 42 are in the coupling position. Lock fingers 46 are attached to the hat-shaped top wall 24 at one end and extend radially outwardly in cantilever fashion. Radial lock fingers 46 preferably terminate at the inner surface of cylindrical wall 22 to facilitate molding valve member 18 and so that the radial lock fingers 46 do not protrude outwardly of the cylindrical wall 22 and cause snagging problems. Cylindrical wall 22 has four circumferentially spaced slots in the upper portion to facilitate molding of lugs 42 and two diametrically opposed rectangular windows that facilitate molding of the radial lock fingers 46. The rectangular windows also provide access for depressing the ends of the lock fingers 46 and releasing the lock fingers 46 from the notches 44.

Lock fingers 46 are preferably relaxed and substantially unstressed when engaged in notches 44. Two lock fingers are also preferably used as a safety precaution to prevent inadvertent uncoupling of the valve and cap members 16 and 18 because both lock fingers 46 must be depressed simultaneously to initiate release and uncoupling. For a more permanent attachment several lock fingers can be used as the difficulty of initiating release increases with the addition of each locking finger. On the other hand, a single locking finger may be preferred where frequent uncoupling is necessary.

A float 48 is disposed inside valve member 16 and retained by a seat 50 that is attached to the bottom of wall 22 by outwardly projecting hooks 52 that snap fit into in slots 54 in the bottom portion of wall 22. Float 48 includes a hollow stem shaped valve 56 that cooperates with the lower valve seat 31 of valve member 16. Float 48 rests on a coil spring 58 that is supported by seat 50. Vent valve 12 is normally open to vent fuel vapors in fuel tank 14 to a vapor storage device such as a charcoal canister (not shown). However, the vent valve 12 is closed by float 48 to prevent liquid fuel flow through passage 30 when the fuel tank 14 is tilted, inverted or full of fuel.

Figure 5:
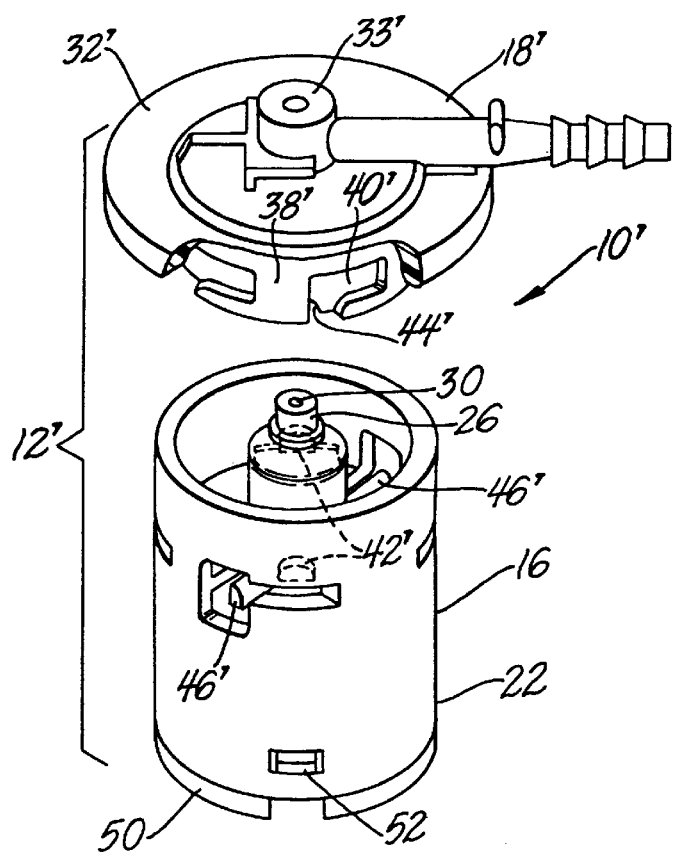
FIG. 5 is an exploded perspective view of a modification of the fuel vapor vent valve shown in FIGS. 1–4.

FIG. 5 illustrates a modified vent valve 10' having a multi-part valve housing 12' wherein the lock fingers 46' of the valve member 16' are repositioned in the circumferential direction and the notches 44' of the cap member 18' are repositioned in the skirt 38' to coincide with the entrance portion of the L-shaped slots 40'. Vent valve 12' is otherwise the same as vent valve 12 and corresponding parts are identified with the same numerals. In modified vent valve 12'; each of the resilient lock fingers 46' engage a wall portion at the open-end of a keyway 40' to secure the members in the locking position where each of the lugs 42 engage a wall at the closed end of the keyway.

Figure 6:
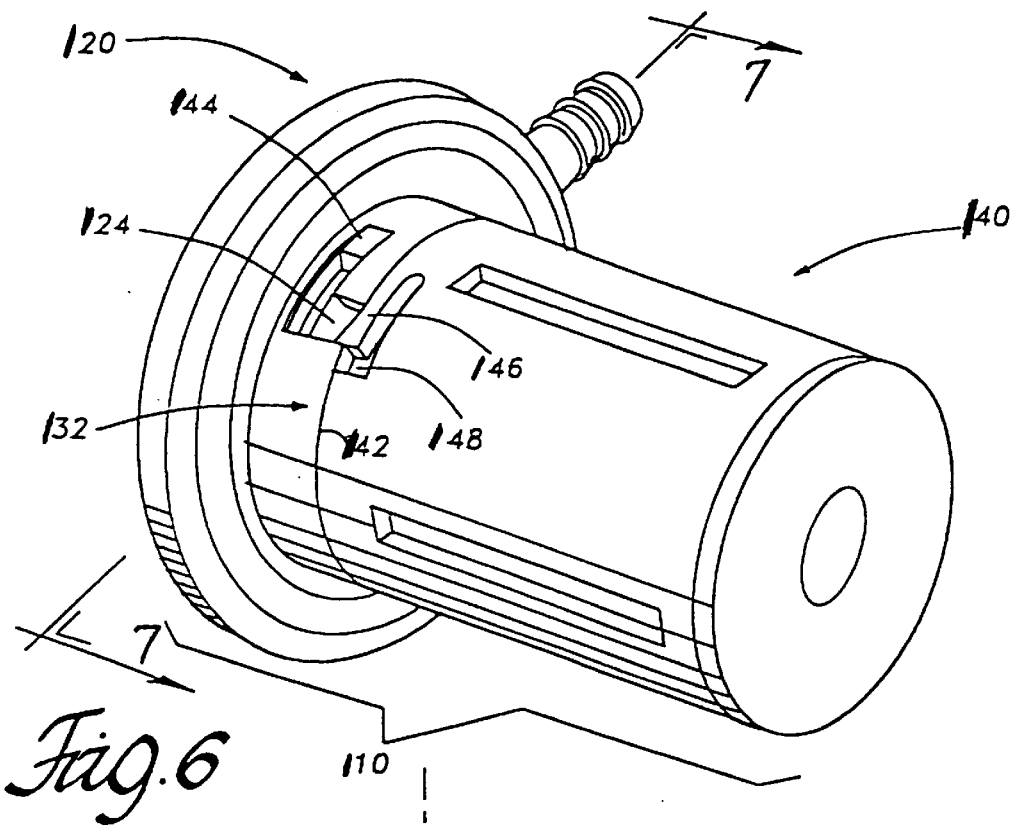
FIG. 6 is a perspective view of another fuel vapor vent valve having a multi-piece housing that includes a second preferred embodiment of the valve coupling mechanism of the present invention.

FIG. 6 discloses another vent valve having a multi-piece housing that includes a second preferred embodiment of the valve coupling mechanism of the present invention indicated generally at 110. In this embodiment the outer diameter of the skirt of the cap or fitting member 120 is the same as the outer diameter of the cylindrical wall of the valve or body member 140. In this case valve member 140 includes an upper neck portion 142 onto which the skirt of the cap member 120 fits for coupling. The valve coupling mechanism 110 includes retention means 114 comprising rectangular-shaped radial lugs 144 disposed relative to the valve member 140, and L-shaped or bayonet slotted keyways 124 disposed relative to the fitting.

The valve coupling mechanism 110 also includes resilient locking elements 146 that cooperatively engage with the corresponding keyways 124. The resilient locking elements 146 of the second embodiment are preferably disposed on the valve member 140 with the radial lugs 144.

Each resilient locking element 146 is preferably in the shape of a protruding finger, and extends above the neck 142 of the valve member 140. The valve member 140 also includes a recess 148 into which the resilient locking element 146 is compressed while the cap member 120 is being mounted onto and released from the valve member 140. The recesses 148 are preferably arcuate and similar in shape to the resilient locking elements 146, so that the valve member 140 complete with finger and recess 148 can be formed from a single piece. Each resilient locking element 146 is relaxed during engagement, and stressed while the cap member 120 is being mounted onto and released from the valve member 140.

Figure 7:
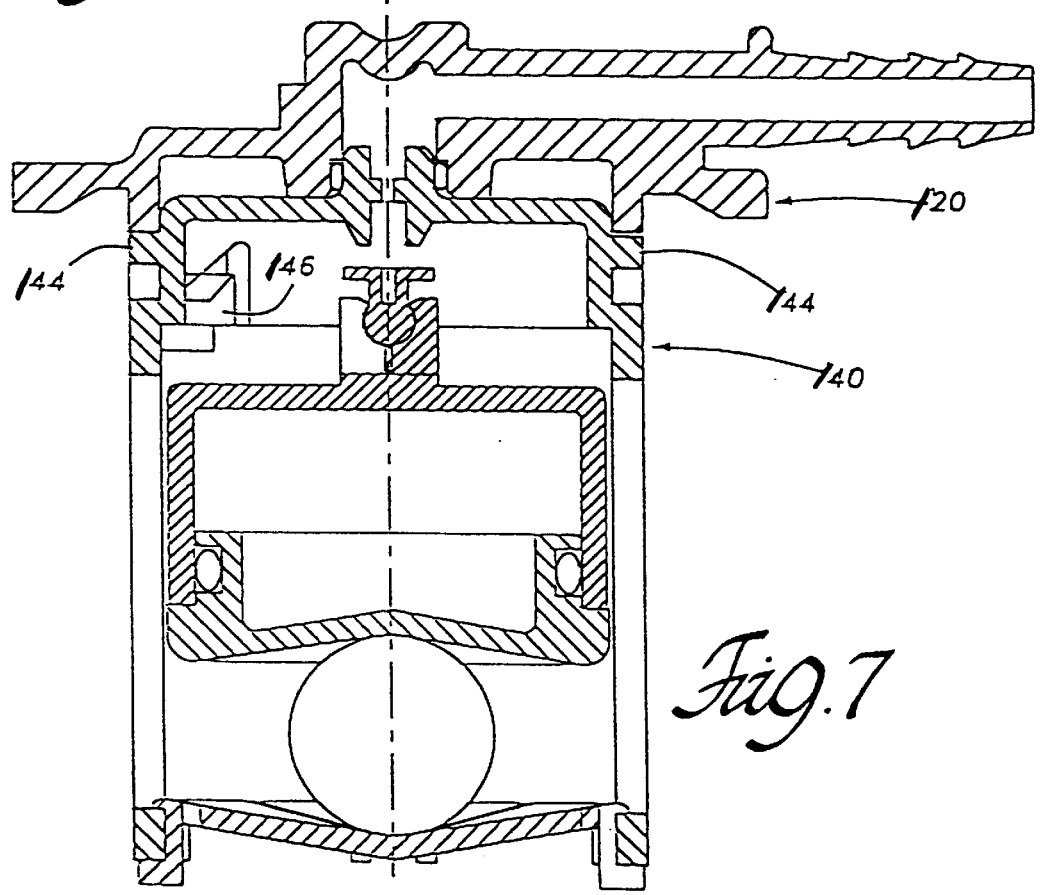
FIG. 7 is a detailed section taken substantially along the line 7—7 of FIG. 6 looking in the direction of the arrows.
Figure 8:
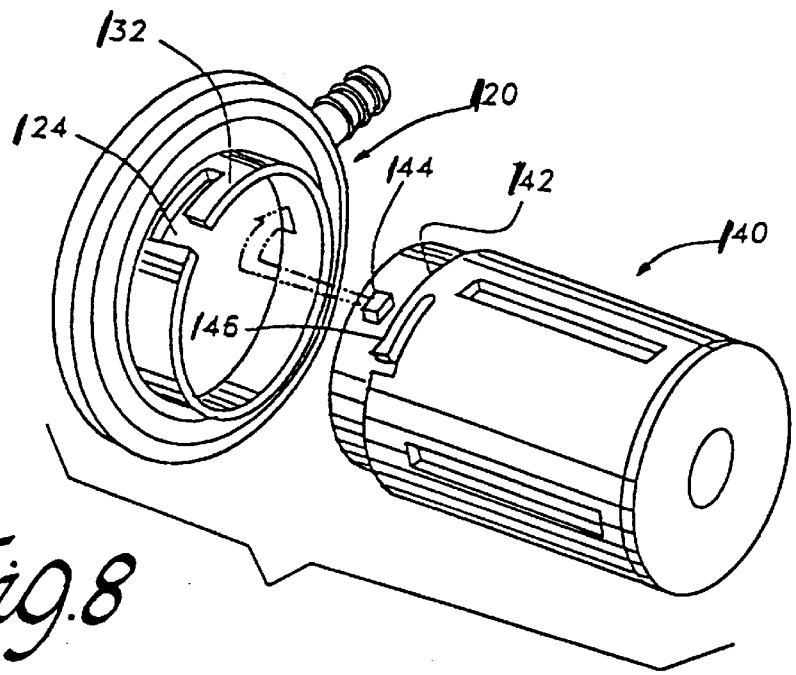
FIG. 8 is an exploded perspective view of the fuel vapor vent valve of FIG. 6.

The cap member 120 as shown in FIGS. 6, 7 and 8 preferably includes two resilient locking elements 146 diametrically opposed from each other. In order to release the members from engagement, the resilient locking elements 146 must be manually depressed (see FIG. 9) simultaneously into the adjoining recesses 148 as the fitting member 120 is twisted initially in the tangential plane, and subsequently withdrawn along the axial plane.

The retention means 114 and the resilient locking elements 146 combine to enable secure engagement between the valve member 140 and the cap member 120 radially, tangentially, and axially.

Relative radial movement between the cap and valve members 120 and 140 during engagement is prevented by making the fitting member 120 slightly larger circumferentially than the body member 140, so that the body member 140 nests comfortably within the fitting member 120.

Relative tangential movement between the cap and valve members 120 and 140 during engagement is prevented in that a face 147 of the resilient locking element 146 abuts the entry portion 125 of the keyway 124, preventing relative rotation in the counterclockwise direction. Engagement between the radial lug 144 and the end portion 126 of the keyway 124 prevents relative rotation between the members in the opposing clockwise direction.

Relative axial movement between the cap and valve members 120 and 140 during engagement is prevented in that the lug 144 in combination with the keyway 124, sandwich about a protruding extension of the cap member 120.

The opposing resilient locking element 146 operates as a safety to prevent inadvertent depression of the resilient locking element 146. In applications where a permanent attachment between the cap and valve members 120 and 140 is needed, more than two resilient locking elements 146 are recommended. The difficulty of releasing the cap and valve members 120 and 140 from engagement increases with the addition of each locking element 146. In applications where frequent disengagement is necessary, a single resilient locking element 146 may be preferred.

FIG. 8 discloses the cap member 120 of FIG. 6 being mounted onto the valve member 140. Initially, the cap member 120 is positioned relative to the valve member 140 along an axial plane as the radial lugs 144 are aligned with the keyways 124.

As the radial lugs 144 slide into the keyways 124, the resilient locking elements 146 are depressed inwardly towards the corresponding recesses 148 in the body member 140 until the radial lugs 144 reach a first stop in their respective keyways 124.

The cap and valve members 120 and 140 are then rotated relative to each other until the radial lugs 144 reach the end portion 126 of their respective keyways 124. The resilient locking elements 146 are relaxed as they enter the keyways 124 and engagement occurs. The resilient locking elements 146 are relaxed during engagement.

Figure 9:
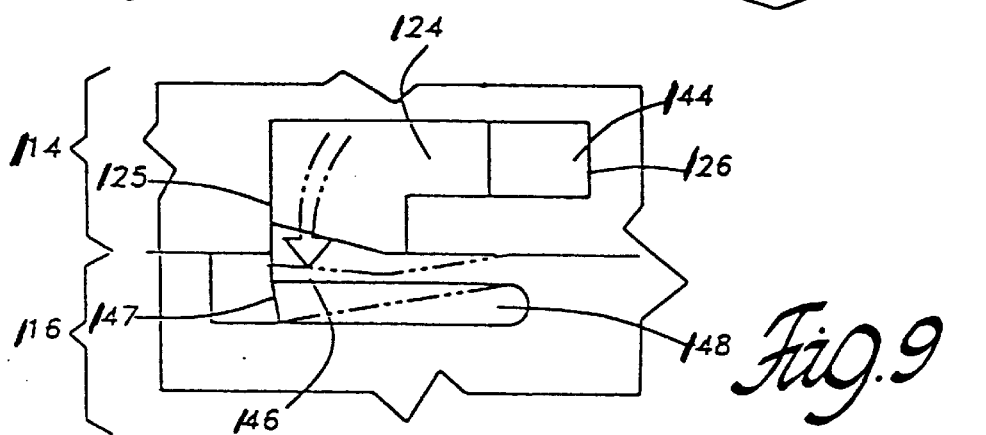
FIG. 9 is an enlarged fragmentary view of the valve coupling mechanism of FIG. 6.

FIG. 9 discloses the cap member 120 of FIG. 6 being released from the valve member 140.

The valve member 140 is initially in the engagement position relative to the cap member 120. To initiate release, all of the resilient locking elements 146 must be simultaneously depressed towards their respective recesses 148 and away from the radial lugs 144 until the faces 147 clear the entry portions 125 of the keyways 124 as shown in phantom in FIG. 9. The cap member 120 is then twisted or rotated relative to the valve member 140, until the radial lug 144 encounters a radial stop against the keyway 124.

The cap member 120 is then withdrawn axially relative to the valve member 140 as the radial lugs 144 slide through the axial entry portion 125 of the keyways 124, until the cap member 120 is released from the valve member 140.

Figure 10:
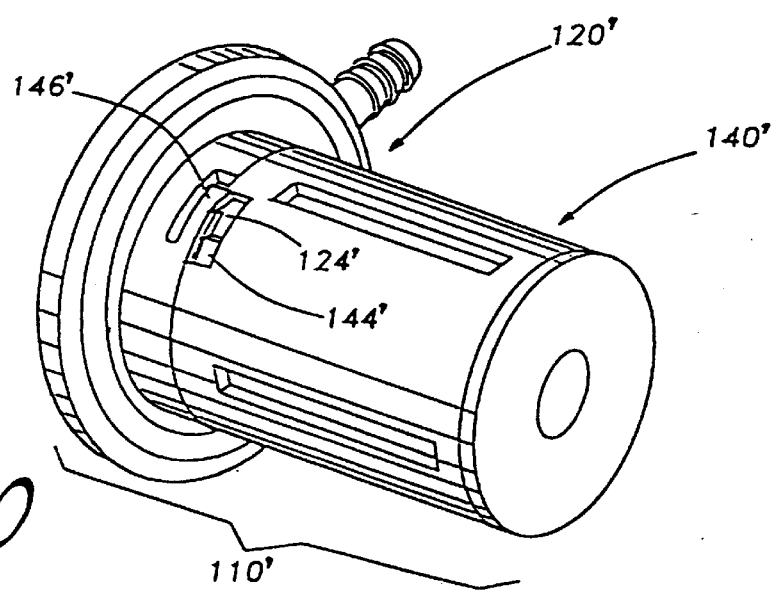
FIG. 10 a perspective view of a modification of the fuel vapor vent valve shown in FIGS. 6–9.

FIG. 10 discloses a modification of the second preferred embodiment of the valve coupling mechanism 110 that is very similar. In the modified valve coupling mechanism 110' the resilient locking elements 146' and the keyways 124' are disposed on the skirt of the cap member 120' and the corresponding keyways 124' are disposed on the valve member 140.' The vent valve of FIG. 10 is otherwise the same as the vent valve of FIGS. 6–9.

FIGS. 11 through 15 disclose still another vent valve assembly 200 of the invention. Fuel vapor vent assembly 200 comprises a multipart valve housing 212 of molded plastic construction for insertion into a fuel tank through an opening through a wall of the fuel tank such as the fuel tank 14 shown in FIG. 2.

Housing 212 comprises a valve member 216 and a cap member 218 that are attached together by a snag-proof coupling arrangement indicated generally at 220. Valve member 216 is preferably molded of a material that is highly resistant to gasoline fuel permeation and experiences little or no growth when immersed in gasoline, such as acetyl resins and copolymers. On the other hand, cap member 218 is preferably molded of material that is readily weldable to gasoline tanks such as high density polyethylene (HDPE).

Structurally, valve member 216 has a cylindrical wall 222 that has an outer diameter that is somewhat smaller that the diameter of the opening through the wall of the fuel tank 14 so that the valve member 216 can be inserted into the fuel tank 14 through the opening easily. Valve member 216 has a hat shaped top wall 224 that supports a vertical tube 225 that defines an upper collar 226 and a vertical passage 230 through the top. Passage 230 includes an upper liquid catch basin in upper collar 226, a central orifice and a lower valve seat in a lower collar like the central orifice 30, lower valve seat 31 and lower collar 28 shown in FIGS. 1–4.

Cap member 218 has a flange 232 that has an outer diameter that is considerably larger than the diameter of the opening through the wall of the fuel tank 14. Thus flange 232 is adapted to be attached to an exterior surface of the wall of the fuel tank 14 when valve member 216 is inserted into the fuel tank. Cap member 218 like cap member 18 is preferably welded to the top of fuel tank 14 as shown in FIG. 2.

Cap member 218 includes a lower collar 234 that defines a seat for upper collar 226 of valve member 216. Cap member 218 also includes a vapor cavity above the liquid catch basin in upper collar 226, and a traverse exit passage that extends through an exit pipe 236 above flange 232 like those of cap member 18 shown in FIGS. 1–4.

Upper collar 226 of valve member 216 and lower collar 234 of cap member 218 form a sealed passage from the valve seat at the lower end of passage 230 to the outboard end of exit pipe 236 when the upper collar 226 of valve member 216 is seated in the lower collar 234 of cap member 218 by coupling the valve and cap members 216 and 218 together.

The means for coupling cap member 218 to valve member 216 includes a depending skirt 238 of cap member 216 that is sized for insertion into the upper end portion of the cylindrical wall 222. The outer wall of skirt 238 includes a plurality of circumferentially spaced keyways 240. Keyways 240 are generally L-shaped and have an open-ended axial leg that leads into a close-ended circumferential leg. Valve member 218 has a corresponding number of circumferentially spaced lugs 242 on the inner surface of cylindrical wall 222 that protrude radially inwardly. Lugs 242 enter keyways 240 via the entrances of the open ended axial legs when skirt 238 is inserted into cylindrical wall 222 and engage the circumferential legs in a coupling position when valve member 216 is then rotated in a clockwise direction with respect to cap member 218.

The cap member 218 and the valve member 216 also include means for retaining lugs 242 in the coupling position comprising a plurality of circumferentially spaced radial notches 244 in the respective circumferential legs of keyways 240 at the inner ends. Notches 244 engage and trap the lugs 242 in the inner ends of keyways 240 when the lugs 242 are in the coupling position as shown in FIGS. 12 and 15.

Cylindrical wall 222 has four circumferentially spaced slots 246 in the upper portion to facilitate molding of lugs 242. Slots 246 are also elongated in the circumferential direction having a length that is approximately three times the length of lugs 242 in the circumferential direction. The elongation of slots 246 increases the flexibility of the beam portions 248 of the cylindrical wall 222 that carry the lugs 242 centrally. Elongated slots 246 also provide access for prying beam portions 248 outwardly to release lugs 242 from the notches 244 so that cover 218 can be detached by twisting cover 218 until lugs 242 align with the open ended axial portions of keyways 240.

The increased flexibility accommodates the coupling process as the lugs 242 ride up ramps 243 in the circumferential legs of keyways 240 leading up to notches 244 as shown in FIG. 13. Beam portions 248 are preferably relaxed and substantially unstressed when lugs 242 are engaged in notches 244 as shown in FIGS. 12 and 15. At least two lugs 242 are preferably used as a safety precaution to prevent inadvertent uncoupling of the valve and cap members 216 and 218 because two beam portions 248 must be bulged outwardly simultaneously to initiate release and uncoupling. Bulging may be effected by inserting a screw driver or the like in appropriate slots 246 and prying beam portions 248 radially outwardly until lugs 242 are released from notches 244. For a more permanent attachment several lugs such as the four lugs 242 shown in FIGS. 11–15 can be used as the difficulty of initiating release increases with the addition of each lug. On the other hand, a single locking lug 242 may be preferred where frequent uncoupling is necessary.

A float is disposed inside valve member 216 and retained by a seat that is attached to the bottom of wall 222 such as the float 48 and seat 50 shown in FIGS. 1–4. The float also includes a hollow stem shaped valve that cooperates with the lower valve seat of valve member 216 and also rests on a coil spring (such as coil spring 58 shown in FIGS. 1–4) that is supported by the seat attached to the bottom of wall 222. Vent valve 212 is normally open to vent fuel vapors in a fuel tank to a vapor storage device such as a charcoal canister (not shown). However, the vent valve 212 is closed by the float to prevent liquid fuel flow through passage 230 when the fuel tank is tilted, inverted or full of fuel.

While the valve coupling mechanisms of the invention has been illustrated in connection with a vent valve having a multi-piece housing, it should be understood that the invention is applicable to any valve having a multi-piece housing and in an even broader aspect to any coupling mechanism for connecting two members together.

Obviously, many modifications and variations of the present invention in light of the above teachings may be made. It is, therefore, to be understood that, within the scope of the appended claims, the invention may be practiced otherwise than as specifically described.

We claim:

1. A snag-proof arrangement for coupling a first member to a second member comprising:

the first member having a cylindrical wall that has a first outer diameter, the second member having a flange that has a second outer diameter that is greater than the first outer diameter of the first member and an annular skirt that fits inside the cylindrical wall of the first member, a circumferential keyway in an outer portion of the annular skirt of the second member, the annular skirt having an inner portion that is unintempted by the circumferential keyway, a radial lug on the cylindrical wall of the first member that extends radially inwardly and is engaged in a coupling position in the keyway of the second member by rotating the second member relative to the first member, and means for retaining the radial lug in the coupling position in the circumferential keyway.

2. The snag-proof arrangement as defined in claim 1 wherein the means for retaining the radial lug in the coupling position comprises a resilient finger of the first member that engages a notch in the annular skirt of the second member.

3. The snag-proof arrangement as defined in claim 2 wherein the resilient finger is a cantilever beam that extends outwardly from an anchor spaced radially inwardly of the cylindrical wall of the first member.

4. The snag-proof arrangement as defined in claim 3 wherein the cantilever beam does not extend outwardly of the cylindrical wall of the first member.

5. The snag-proof arrangement as defined in claim 4, wherein the first member includes a top wall having an upper collar and a passage that extends through the collar to a lower valve seat, the second member has lower collar and a passage through the lower collar that extends to an exit above the flange, and the upper collar and the lower collar cooperate to form a sealed passage from the valve seat to the exit when the first member is coupled to the second member.

6. A snag-proof arrangement for coupling a first member to a second member comprising:

the first member having a cylindrical wall that has a first outer diameter, the second member having a flange that has a second outer diameter that is greater than the first outer diameter of the first member and an annular skirt that fits inside the cylindrical wall of the first member, a circumferential keyway in the annular skirt of the second member, a radial lug on the cylindrical wall of the first member that extends radially inwardly and is engaged in a coupling position in the keyway of the second member by rotating the second member relative to the first member, and means for retaining the radial lug in the coupling position including a resilent portion of the first member and a notch in the annular skirt of the second member.

7. The snag proof arrangement of claim 6 wherein the notch is in the circumferential keyway.

8. The snag proof arrangement of claim 7 wherein the lug extends radially inwardly from the resilent portion of the first member and the notch is at a terminal end of the circumferential keyway, the lug being retained in the notch in the keyway when in the coupling position.

9. The snag proof arrangement of claim 8 wherein the circumferential keyway has a ramp leading up to the notch.

10. A snag-proof arrangement for coupling a first member to a second member comprising:

the first member having a cylindrical wall that has a first outer diameter, the second member having a flange that has a second outer diameter that is greater than the first outer diameter of the first member and an annular skirt that fits inside the cylindrical wall of the first member, a circumferential keyway in an outer portion of the annular skirt of the second member, the annular skirt having an inner portion that is uninterrupted by the circumferential keyway, a notch at a terminal end of the keyway, the cylindrical wall of the first member having a resilient portion, the radial lug on the resilient portion of the cylindrical wall that extends radially inwardly and is engaged in a coupling position in the keyway of the second member by rotating the second member relative to the first member, and the radial lug being retained in the coupling position in the keyway by engaging in the notch at the terminal end of the keyway.

11. The snag-proof arrangement of claim 10 wherein the keyway has a ramp leading up to the notch.

* * * * *